(12) United States Patent
Vasseur (10) Patent No.: US 8,254,272 B1
(45) Date of Patent: Aug. 28, 2012

(54) OPERATIONS ADMINISTRATION MANAGEMENT FOR PATH COMPUTATION ELEMENT CHAINS

(75) Inventor: Jean-Philippe Vasseur, Dunstable, MA (US)

(73) Assignee: Cisco Technology, Inc., San Jose, CA (US)

(*) Notice: Subject to any disclaimer, the term of this patent is extended or adjusted under 35 U.S.C. 154(b) by 772 days.

(21) Appl. No.: 11/680,388

(22) Filed: Feb. 28, 2007

(51) Int. Cl.
H04L 12/28 (2006.01)
H04L 12/26 (2006.01)
H04L 12/56 (2006.01)

(52) U.S. Cl. ............ 370/248; 370/236.2; 370/249; 370/400

(58) Field of Classification Search .......... 370/236, 370/236.1, 236.2, 252, 241.1, 248, 231, 522; 709/223, 224, 227, 228
See application file for complete search history.

(56) References Cited

U.S. PATENT DOCUMENTS

| | | | | |
|---|---|---|---|---|
| 5,095,444 | A * | 3/1992 | Motles | 709/224 |
| 5,712,853 | A * | 1/1998 | Mathur et al. | 370/467 |
| 5,802,316 | A * | 9/1998 | Ito et al. | 709/249 |
| 6,256,309 | B1 | 7/2001 | Daley et al. | |
| 6,400,688 | B1 * | 6/2002 | Lau et al. | 370/236.1 |
| 6,545,979 | B1 * | 4/2003 | Poulin | 370/241.1 |
| 6,600,724 | B1 | 7/2003 | Cheng | |
| 6,717,920 | B1 | 4/2004 | Cheng | |
| 6,778,492 | B2 | 8/2004 | Charny et al. | |
| 6,795,400 | B1 * | 9/2004 | Schick | 370/236 |
| 6,925,062 | B2 * | 8/2005 | Tanaka et al. | 370/241.1 |
| 7,031,262 | B2 | 4/2006 | Vasseur et al. | |
| 7,046,693 | B1 * | 5/2006 | Lapointe et al. | 370/468 |
| 7,486,622 | B2 * | 2/2009 | Regan et al. | 370/236 |
| 7,599,303 | B2 * | 10/2009 | Nadeau et al. | 370/248 |
| 2004/0042402 | A1 * | 3/2004 | Galand et al. | 370/237 |
| 2005/0053006 | A1 * | 3/2005 | Hongal et al. | 370/236.2 |
| 2005/0213594 | A1 * | 9/2005 | Klink | 370/428 |
| 2006/0039391 | A1 | 2/2006 | Vasseur et al. | |
| 2007/0025277 | A1 | 2/2007 | Sajassi et al. | |
| 2008/0101241 | A1 * | 5/2008 | Mohan et al. | 370/236.2 |
| 2008/0219272 | A1 * | 9/2008 | Novello et al. | 370/401 |
| 2011/0176458 | A1 * | 7/2011 | Buskens et al. | 370/255 |

OTHER PUBLICATIONS

Awduche, D., Network Working Group Request for Comments 3209, entitled "RSVP-TE: Extensions to RSVP for LSP Tunnels," IETF, Dec. 2001, pp. 1-57.
Smit, H., Network Working Group Request for Comments 3784, entitled "Intermediate-System-to-Intermediate-System (IS-IS) Extensions for Traffic Engineering (TE)," IETF, Jun. 2004, pp. 1-13.
Katz, C. et al, Network Working Group Request for Comments 3630, entitled "Traffic Engineering (TE) Extensions to OSPF Version 2," IETF, Sep. 2003, pp. 1-14.

(Continued)

*Primary Examiner* — Warner Wong
(74) *Attorney, Agent, or Firm* — Cesari and McKenna, LLP (57) ABSTRACT

In one embodiment, an interested node (e.g., a path computation client or "PCC", network management node, etc.) may send a path computation element (PCE) monitor request along a particular path computation chain to request performance information about one or more PCEs along the chain. In response, the interested node may receive a PCE monitor reply having performance information about the one or more PCEs along the chain. In another embodiment, one or more PCEs (along the chain) may receive the PCE monitor request and forward the request downstream along the chain. Upon the request reaching a final PCE, each PCE along the chain may insert the requested performance information into the PCE monitor reply and forward the reply with the performance information along the path computation chain toward the interested node.

31 Claims, 7 Drawing Sheets

OTHER PUBLICATIONS

Farrel, A., et al, Network Working Group Request for Comments 4655, entitled "A Path Computation Element (PCE)-Based Architecture," IETF, Aug. 2006, pp. 1-38.

Vasseur, et al., Networking Working Group Internet Draft, entitled "Path Computation Element (PCE) Communication Protocol (PCEP)—Version 1 (draft-ietf-pce-pcep-03.txt)," Oct. 2006, pp. 1-61.

Vasseur, JP, Networking Working Group Internet Draft, entitled "A Set of Monitoring Tools for Path Computation Element Based Architecture (draft-vasseur-pce-monitoring-01.txt)," Oct. 2006, pp. 1-15.

U.S. Appl. No. 10(767,574, entitled "Computing Inter-Autonomous System MPLS Traffic Engineering LSP Paths," filed Sep. 18, 2003, by Vasseur et al., 53 pgs.

* cited by examiner

OPERATIONS ADMINISTRATION MANAGEMENT FOR PATH COMPUTATION ELEMENT CHAINS

TECHNICAL FIELD

The present disclosure relates generally to computer networks, and, more particularly, to Operations Administration Management (OAM) for Path Computation Element (PCE) chains.

BACKGROUND

Path computation for tunnels of a computer network, e.g., label switched paths (LSPs), may be performed by head-end nodes of the tunnels, or by specialized Path Computation Elements (PCEs). For example, tunnels in many Multi-Protocol Label Switching (MPLS) Traffic Engineering (TE) networks (e.g., MPLS TE-LSPs) are computed using a constrained shortest path first (CSPF) algorithm, which offers high flexibility/scalability, and is well-equipped to handle frequent topology changes, dynamic traffic demands, and resource availability changes. While head-end nodes of tunnels may often be equipped to compute a suitable path for a tunnel, PCEs offer a variety of benefits not generally available to head-end nodes. For instance, PCEs may have advanced knowledge of the network topology, such as knowledge of existing tunnels through the network of which the head-end nodes may not be aware, visibility in other domains, etc. In addition, PCEs may be configured to communicate with other PCEs, such as for inter-domain (inter-area and/or inter-Autonomous-System, "inter-AS") path computation.

Accordingly, a path computation client (PCC), such as a head-end node, may send a request to a locally-reachable PCE to compute a path for a tunnel to one or more desired destinations (e.g., possibly with one or more constraints, as will be understood by those skilled in the art). In situations where a destination is beyond the knowledge of the local PCE, the local PCE may forward the request to a remote (next-hop/downstream) PCE, e.g., in a different domain, to continue the computation of the path; thus the local PCE acts as a PCC to the cooperating remote PCE. The remote PCE may further forward the request to other remote PCEs toward the destination and so on, until a final PCE (local to the destination) is reached. Each remote PCE may then return its local portion of one or more computed paths to its upstream PCE (that is, the PCC from which each PCE received the forwarded request), which may then compute its respective portion based on the received portions of the computed path(s). In this manner, a "path computation chain" or "PCE chain" is established, i.e., along a path of PCEs used to compute the path to the destination (e.g., also referred to as "recursive path computation," as may be understood by those skilled in the art).

Operations Administration Management (or Maintenance) (OAM) tools, as will be understood by those skilled in the art, may be used to provide system or network fault indication, performance monitoring, security management, diagnostic functions, etc. Currently, however, there are no known end-to-end OAM tools available to obtain performance metrics and/or other information from PCEs along particular PCE (path computation) chains. For example, occasionally, a path computation request will fail or will be delayed for an extended period of time. It may be beneficial to determine the cause of the failure/delay, such as which particular PCE is the cause/bottleneck, what is the cause, etc. By determining the cause(s), a PCC may be able to more efficiently select a PCE (or set of PCEs), such as PCEs that are operational/functional and/or are less of a bottleneck, etc. Also, such a set of OAM tools for PCE chains may be useful for general network management, such as where performance metrics of the PCE chains are particularly difficult/challenging to monitor (e.g., inter-domain chains). There remains a need, therefore, for OAM for PCE (path computation) chains.

BRIEF DESCRIPTION OF THE DRAWINGS

The above and further advantages of the invention may be better understood by referring to the following description in conjunction with the accompanying drawings in which like reference numerals indicate identically or functionally similar elements, of which.

DESCRIPTION OF EXAMPLE EMBODIMENTS

Overview

According to embodiments of the disclosure, an interested node (e.g., a path computation client or "PCC", network management node, etc.) may send a path computation element (PCE) monitor request along a path computation chain to request performance information about one or more PCEs along the chain. In response, the interested node may receive a PCE monitor reply having performance information about the one or more PCEs along the chain. Also, according to embodiments of the disclosure, one or more PCEs (along the chain) may receive the PCE monitor request and forward the request downstream along the chain. Upon the request reaching a final PCE, the PCE monitor reply is generated and each PCE along the chain may insert the requested performance information into the reply, which is then forwarded with the performance information along the path computation chain toward the interested node.

Description

A computer network is a geographically distributed collection of nodes interconnected by communication links and segments for transporting data between end nodes, such as personal computers and workstations. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Since management of interconnected computer networks can prove burdensome, smaller groups of computer networks may be maintained as routing domains or autonomous systems. The networks within an autonomous system (AS) are typically coupled together by conventional "intradomain" routers configured to execute intradomain routing protocols, and are generally subject to a common authority. To improve routing scalability, a service provider (e.g., an ISP) may divide an AS into multiple "areas" or "levels." It may be desirable, however, to increase the number of nodes capable of exchanging data; in this case, interdomain routers executing interdomain routing protocols are used to interconnect nodes of the various ASes. Moreover, it may be desirable to inter-connect various ASes that operate under different administrative domains. As used herein, an AS, area, or level is generally referred to as a "domain," and a router that interconnects different domains is generally referred to as a "border router."

Figure 1:
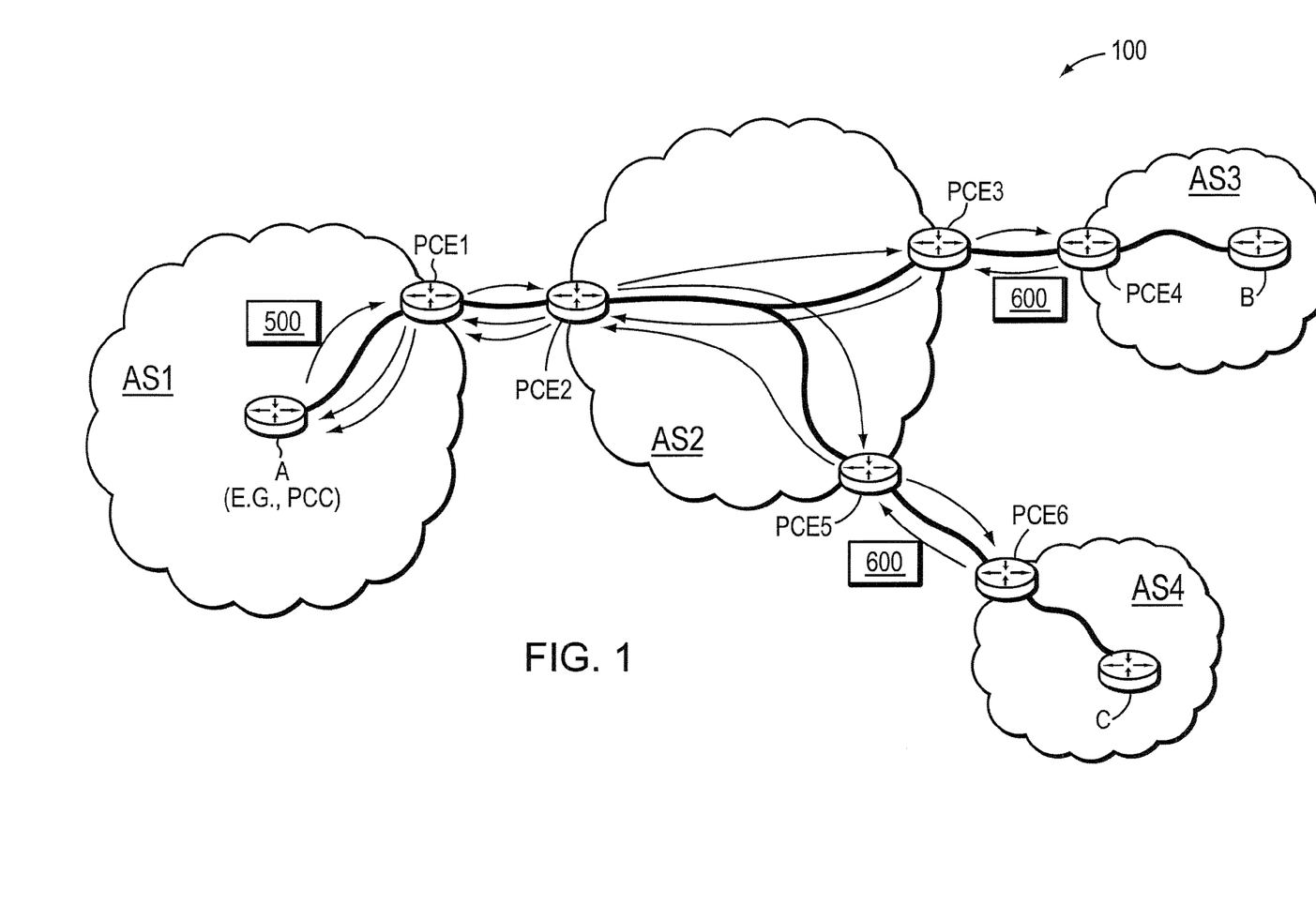
FIG. 1 illustrates an example computer network.

FIG. 1 is a schematic block diagram of an example computer network 100 illustratively comprising a plurality of ASes (AS1-AS4) interconnected by AS border routers (AS-BRs, labeled as "PCE1-PCE6") and inter-AS links as shown. Nodes within the ASes may be present that may interconnect to ASBRs of each AS, as will be understood by those skilled in the art. Illustratively, node A in AS1, node B in AS3, and node C in AS4 are shown, which may be interconnected by one or more paths, each of which may comprise one or more particular links/nodes not shown for ease of discussion. Those skilled in the art will understand that any number of nodes, routers, links, etc. may be used in the computer network, and that the view shown herein is for simplicity. Further, those skilled in the art will also understand that while the present invention is described generally in relation to multiple ASes, it may apply to any network configuration within an AS or area/level (intra-domain), or throughout multiple ASes or areas/levels (inter-domain), or to customer networks and provider core networks, etc.

Data packets may be exchanged among the nodes of the computer network 100 using predefined network communication protocols such as the Transmission Control Protocol/Internet Protocol (TCP/IP), User Datagram Protocol (UDP), Asynchronous Transfer Mode (ATM) protocol, Frame Relay protocol, Internet Packet Exchange (IPX) protocol, etc.

Figure 2:
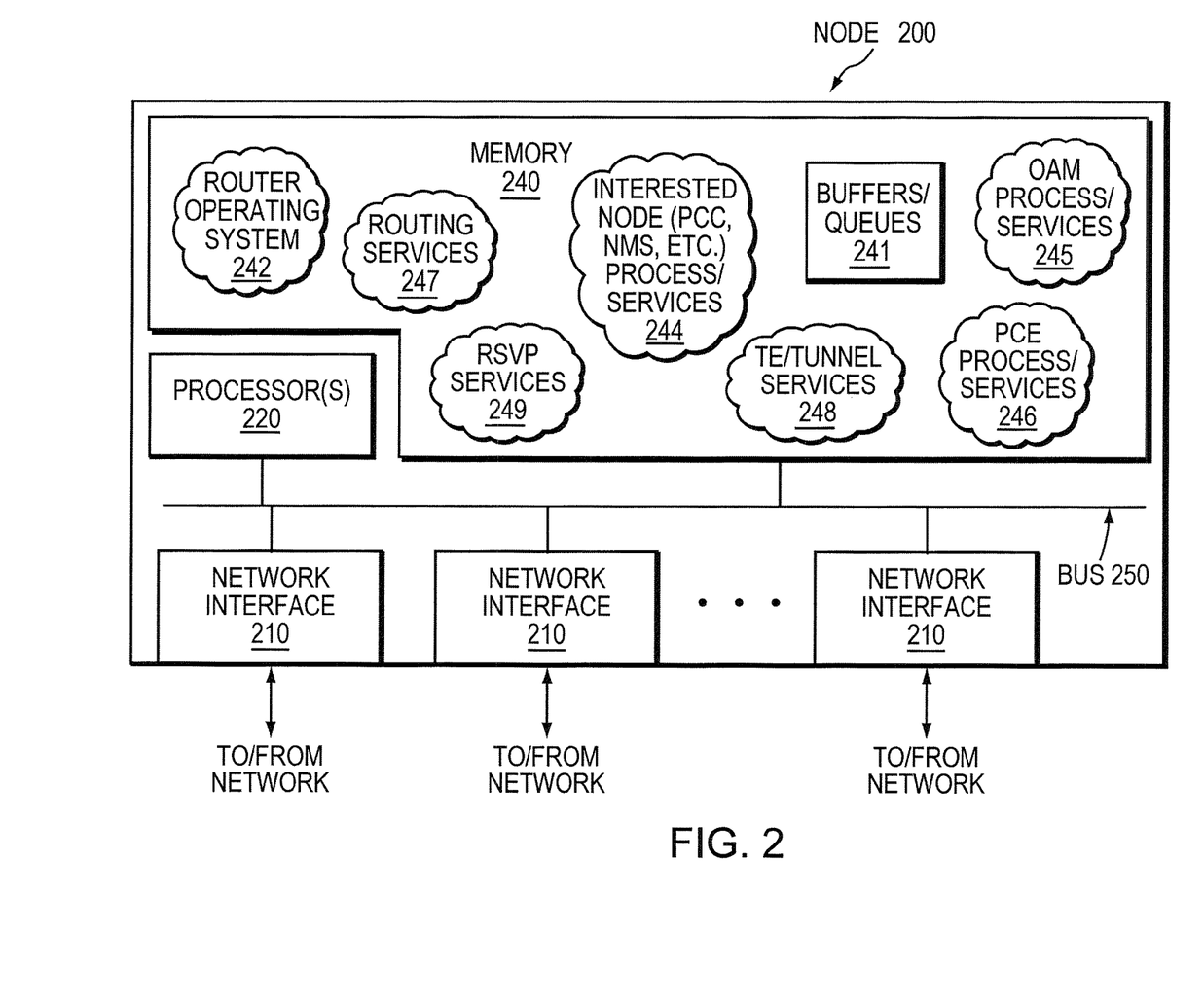
FIG. 2 illustrates an example network device/node.

FIG. 2 is a schematic block diagram of an example node/router 200 that may be advantageously used with one or more embodiments described herein, e.g., as an interested node, a Path Computation Element (PCE), or a Path Computation Client (PCC), as detailed below. The node comprises a plurality of network interfaces 210, one or more processors 220, and a memory 240 interconnected by a system bus 250. The network interfaces 210 contain the mechanical, electrical and signaling circuitry for communicating data over physical links coupled to the network 100. The network interfaces may be configured to transmit and/or receive data using a variety of different communication protocols, including, inter alia, TCP/IP, UDP, ATM, synchronous optical networks (SONET), wireless protocols, Frame Relay, Ethernet, Fiber Distributed Data Interface (FDDI), etc. Notably, a physical network interface 210 may also be used to implement one or more virtual network interfaces, such as for Virtual Private Network (VPN) access, known to those skilled in the art.

The memory 240 comprises a plurality of storage locations that are addressable by each processor 220 and the network interfaces 210 for storing software programs and data structures associated with the present invention. The processor(s) 220 may comprise necessary elements or logic adapted to execute the software programs and manipulate the data structures, e.g., buffers/queues 241. A router operating system 242 (e.g., the Internetworking Operating System, or IOS™, of Cisco Systems, Inc.), portions of which are typically resident in memory 240 and executed by the processor(s), functionally organizes the node by, inter alia, invoking network operations in support of software processes and/or services executing on the router. These software processes and/or services may comprise routing services 247, Traffic Engineering (TE)/Tunnel services 248, Resource ReSerVation Protocol (RSVP) services 249, and as described herein, an example interested node process/service 244 (e.g., for PCCs, a network management system "NMS", etc.) and/or PCE process/service 246, and an Operations Administration Management (or Maintenance) (OAM) process/service 245. It will be apparent to those skilled in the art that other processor and memory means, including various computer-readable media, may be used to store and execute program instructions pertaining to the inventive technique described herein.

Routing services 247 contain computer executable instructions executed by each processor 220 to perform functions provided by one or more routing protocols, such as the Interior Gateway Protocol (e.g., Open Shortest Path First, "OSPF," and Intermediate-System-to-Intermediate-System, "IS-IS"), the Border Gateway Protocol (BGP), etc., as will be understood by those skilled in the art. These functions may be configured to manage routing and forwarding information databases (not shown) containing, e.g., data used to make routing and forwarding decisions. Notably, routing services 247 may also perform functions related to virtual routing protocols, such as maintaining VRF instances (not shown) as will be understood by those skilled in the art.

Multi-Protocol Label Switching (MPLS) Traffic Engineering (TE) has been developed to meet data networking requirements such as guaranteed available bandwidth or fast restoration. MPLS TE exploits modern label switching techniques to build end-to-end tunnels based on a series of constraints through an IP/MPLS network of label switched routers (LSRs). These tunnels are a type of label switched path (LSP) and thus are generally referred to as MPLS TE-LSPs. Examples of MPLS TE can be found in RFC 3209, entitled *RSVP-TE: Extensions to RSVP for LSP Tunnels* dated December 2001, RFC 3784 entitled *Intermediate-System-to-Intermediate-System (IS-IS) Extensions for Traffic Engineering (TE)* dated June 2004, and RFC 3630, entitled *Traffic Engineering (TE) Extensions to OSPF Version* 2 dated September 2003, the contents of all of which are hereby incorporated by reference in their entirety.

Generally, a tunnel is a logical structure that encapsulates a packet (a header and data) of one protocol inside a data field of another protocol packet with a new header. In this manner, the encapsulated data may be transmitted through networks that it would otherwise not be capable of traversing. More importantly, a tunnel creates a transparent virtual network link between two network nodes that is generally unaffected by physical network links or devices (i.e., the physical network links or devices merely forward the encapsulated packet based on the new header). While one example of a tunnel is an MPLS TE-LSP, other known tunneling methods include, inter alia, the Layer Two Tunnel Protocol (L2TP), the Point-to-Point Tunneling Protocol (PPTP), and IP tunnels.

Some applications may incorporate unidirectional data flows configured to transfer time-sensitive traffic from a source (sender) in a computer network to a destination (receiver) in the network in accordance with a certain "quality of service" (QoS). Here, network resources may be reserved for the unidirectional flow to ensure that the QoS associated with the data flow is maintained. The Resource ReSerVation Protocol (RSVP) is a network-control protocol that enables applications to reserve resources in order to obtain special QoS for their data flows. RSVP works in conjunction with routing protocols to, e.g., reserve resources for a data flow in a computer network in order to establish a level of QoS required by the data flow. In the case of traffic engineering applications, RSVP signaling is used to establish a TE-LSP (tunnel) and to convey various TE-LSP attributes to routers, such as border routers, along the TE-LSP obeying the set of required constraints whose path may have been computed by various means.

In particular, RSVP services 249 contain computer executable instructions for implementing RSVP and processing RSVP messages, while TE/tunnel services 248 contain computer executable instructions for implementing TE and tunnel functions. A TE Database (TED, not shown) may be illustratively resident in memory 240 and used to store TE information provided by the routing protocols, such as IGP, BGP, and/or RSVP (e.g., with TE extensions). The TED may be illustratively maintained and managed by TE/tunnel services 248.

Tunnels, e.g., MPLS TE-LSPs, can be configured within a single domain, e.g., area, level, or AS, or may also span multiple domains, e.g., areas, levels, or ASes, and may have guaranteed bandwidth under certain conditions. Illustratively, the tunnels (e.g., TE-LSPs) may be signaled through the use of the RSVP protocol (with Traffic Engineering extensions), and in particular, RSVP TE signaling messages. It should be understood that the use of RSVP serves only as an example, and that other communication protocols may be used in accordance with the embodiments described herein.

Establishment of a tunnel (e.g., TE-LSP) requires computation of a path between a head-end node (LSR) to a tail-end node, signaling along the path, and modification of forwarding tables at intermediate nodes (LSRs) along the path. Optimally, the computed path is the "shortest" path, as measured in some metric (cost, length, etc.), that satisfies all relevant LSP Traffic Engineering constraints or "attributes," such as e.g., required bandwidth, "affinities" (administrative constraints to avoid or include certain links), priority, class type, etc. Path computation can either be performed by the head-end node or by some other entity operating as a Path Computation Element (PCE) not necessarily co-located on the head-end node (e.g., a PCE as described in RFC 4655 by Farrel, Vasseur, and Ash, entitled *A Path Computation Element (PCE)-Based Architecture*, dated August 2006, the contents of which are hereby incorporated by reference as though fully set forth herein). The head-end node (or a PCE) exploits its knowledge of network topology and resources available on each link to perform the path computation according to the LSP Traffic Engineering constraints. Various path computation methodologies are available including CSPF (constrained shortest path first). Notably, when incorporating the use of PCEs, the path computation request (and response) between path computation client (PCC) and PCE may be exchanged in accordance with a protocol specified in Vasseur, et al., *Path Computation Element (PCE) Communication Protocol (PCEP)*—Version 1—<*draft-ietf-pce-pcep-06.txt*>, Internet Draft, February 2007, the contents of which are hereby incorporated by reference in its entirety. It should be understood that the use of PCEP serves only as an example, and that other communication protocols may be used in accordance with the present invention.

Figure 3:
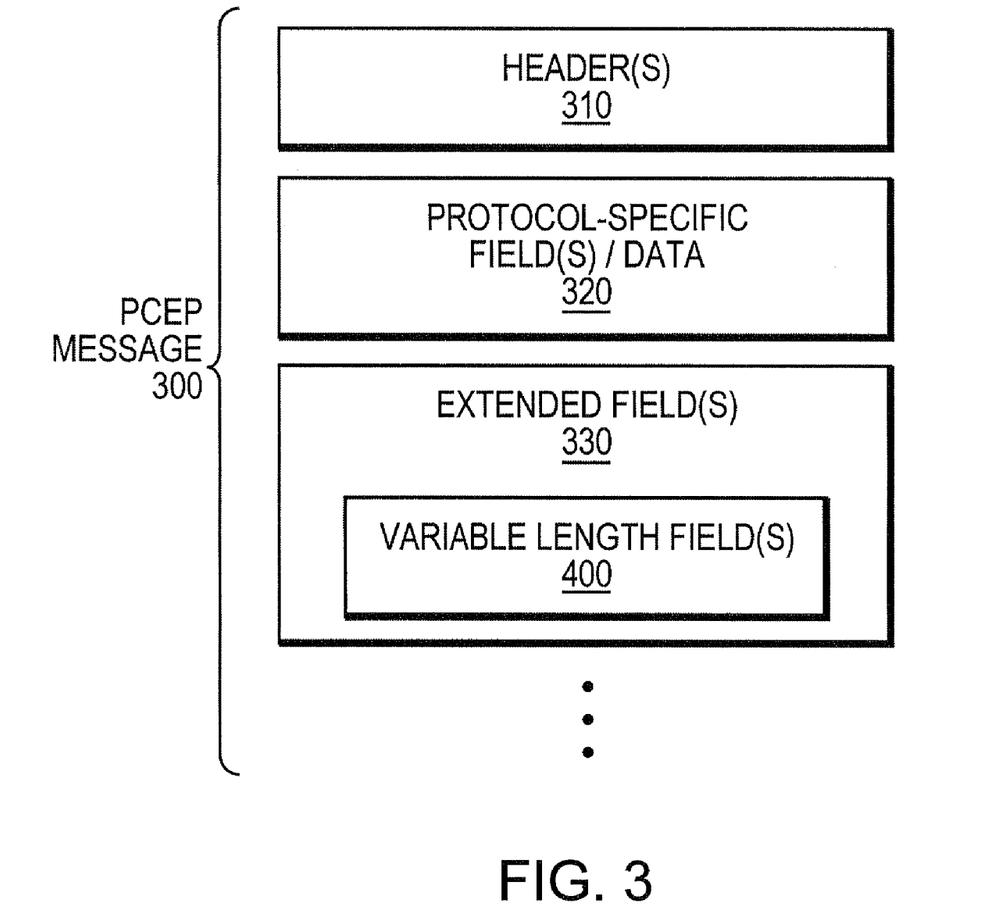
FIG. 3 illustrates an example PCEP message.
Figure 4:
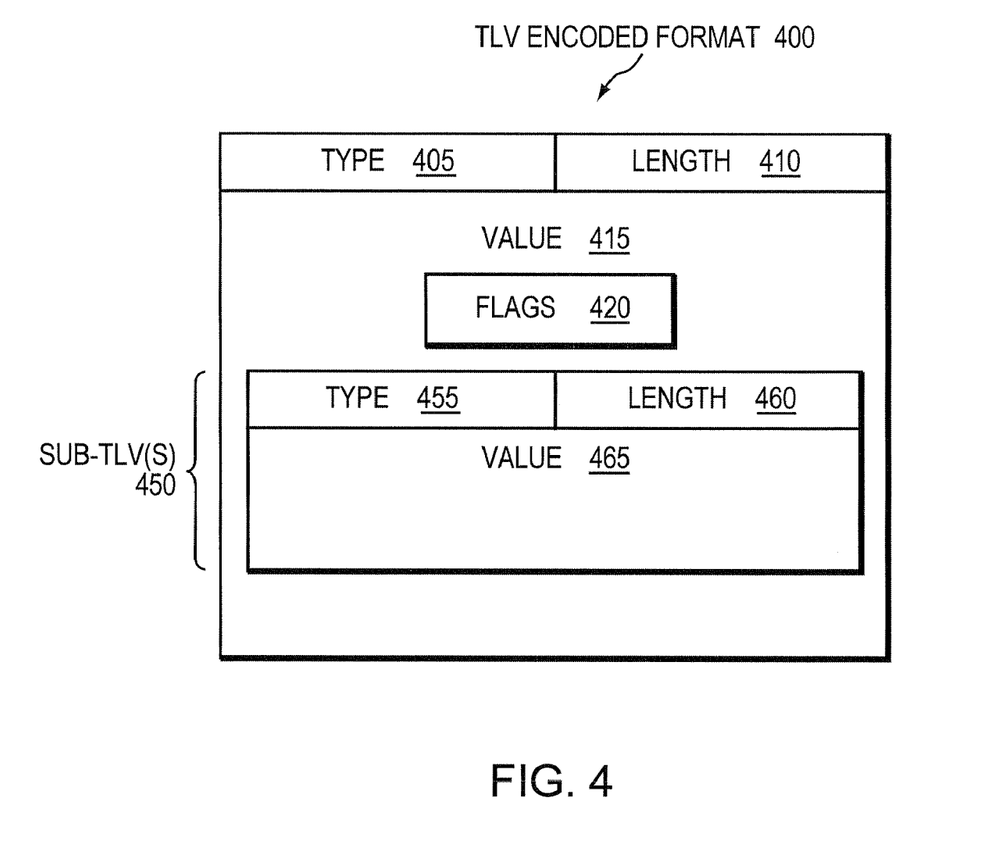
FIG. 4 illustrates an example TLV encoded format.

FIG. 3 is a schematic block diagram illustrating a generic PCEP message 300 that may be transmitted by nodes/devices 200 (e.g., PCCs and PCEs) in accordance with the embodiments described herein. Illustratively, the PCEP message 300 is shown as a high-level generic message, and those skilled in the art will understand that the message may comprise other fields accordingly. The PCEP message 300 includes one or more common headers 310, such as an encapsulation protocol header as well as one or more protocol-specific headers (e.g., IP headers, PCEP headers, etc.). As those skilled in the art will understand, the PCEP message 300 is sent in an encapsulation appropriate to the environment (e.g., TCP/IP, ATM, MPLS, etc.). Thus, the encapsulation protocol header of headers 310 contains information standard for the specific type of encapsulation. PCEP-specific fields/data 320 may be used to contain protocol-specific information, as will be understood by those skilled in the art. For example, a PCEP message 300 may communicate PCEP-specific information between the PCCs and PCEs accordingly, such as Request IDs, constraints/attributes, destinations, computed paths, errors, or other request/reply objects, as will be understood by those skilled in the art. In addition, an extended field(s) section 330 (e.g., an extension to protocol-specific fields) may include one or more variable length fields (TLVs) 400, to be used in accordance with one or more embodiments described herein.

In particular, the TLV encoded format is used to identify a type (T) of information being communicated (conveyed), a length (L) of information to be conveyed, and a value (V) of the actual information conveyed. The length (L) parameter contained in the length field is typically implementation-specific and can denote the length from the beginning of the Type field of the object to the end. However, the length generally denotes the length of the Value (V) field and not the Type (T) or Length (L) fields.

FIG. 4 is a schematic block diagram illustrating the TLV encoded format 400 that may be advantageously used with the one or more embodiments described herein. The TLV 400 may be used for a variable length field contained in PCEP message 300, or other protocol messages in accordance with the embodiments described herein. The TLV 400 is organized to include a Type field 405 containing a predetermined type value indicating the type of data contained in the TLV 400, and a Length field 410, which is a variable length value. The TLV encoded format 400 may also comprise one or more non-ordered sub-TLVs 450 carried within the TLV "payload" (e.g. Value field 415), each having a Type field 455, Length field 460, and Value field 465. Notably, other information may be contained within Value field 415 (and/or 465), such as, e.g., one or more flags in Flags field 420. The fields of the TLV 400 and sub-TLV(s) 450 are used in a variety of manners, including as described herein, according to the embodiments described herein.

One difficulty that arises in crossing domain (e.g., AS) boundaries is that path computation at the head-end node requires knowledge of network topology and resources across the entire network 100 between the head-end node (source) and tail-end node (destination). Yet service providers typically do not share this information with each other across AS borders. Also, network topology and resource information do not generally flow across area/level boundaries even though a single service provider may operate all the areas/ levels. Accordingly, neither the head-end node nor any single PCE generally has sufficient knowledge to compute an inter-domain end-to-end path.

The use of PCEs has been adapted to create a distributed PCE architecture, in order to extend path computation (e.g., for tunnels) across domain (AS, area, and/or level) boundaries. An example of such a distributed (e.g., inter-domain) architecture is described in commonly-owned copending U.S. patent application Ser. No. 10/767,574, entitled COMPUTING INTER-AUTONOMOUS SYSTEM MPLS TRAFFIC ENGINEERING LSP PATHS, filed by Vasseur et al., on Sep. 18, 2003, the contents of which are hereby incorporated by reference in its entirety. In a distributed PCE architecture, the visibility needed to compute paths is extended between adjacent domains so that PCEs may cooperate to compute paths across multiple domains by exchanging virtual shortest path trees (VSPTs). (VSPTs, which may be represented as virtual links made of "loose hops," are used because service providers may desire to maintain their internal network architectures and designs confidential.) One way to compute the VSPTs is by using a virtual shortest path tree (VSPT) algorithm. Generally, a VSPT is a compressed path description (entry and exit/destination points of domains) that informs a previous PCE that a destination can be reached from a set of entry nodes (associated costs may also be provided) in such a way that the internal path specifics are kept confidential from an adjacent domain.

For example, according to the VSPT algorithm, for an inter-domain path computation example such as in FIG. 1, a PCC (Node A) may first send a path computation request (e.g., PCEP message 300) to a known local PCE in its AS, such as PCE1, to compute a path to a destination (e.g., a tail-end node) such as Node B in AS3. Notably, the address of the local PCE may be manually configured or, alternatively, the PCE may advertise itself through flooding within the domain. For instance, various PCE discovery (PCED) techniques may be used that may include indications of PCE capabilities, such as the ability to compute local paths, inter-area paths, inter-AS paths, multi-domain paths, diverse paths, etc. In an illustrative embodiment, a PCED message may be contained within a conventional IGP advertisement, such as through PCED extensions as may be understood by those skilled in the art.

The local PCE (PCE1) receives the path computation request and, in accordance with conventional distributed PCE path computation (as will be understood by those skilled in the art), determines whether it can compute the entire end-to-end path to the destination. If not, the first PCE may forward the request to a next-hop downstream PCE (e.g., PCE2) as determined by a known inter-domain path (e.g., to a known PCE/border router of AS2). The downstream PCE may also forward the request to PCE3, which may forward the request to PCE4 (and so on, as needed) in this manner until a PCE has local knowledge of the destination. The final PCE (with local knowledge of the destination) returns a portion of a computed path (e.g., a portion of a VSPT) to the upstream PCE from which the request was received (e.g., PCE3). The upstream PCE then computes its portion of the path, and returns that portion, combined with the final portion, to the next upstream PCE, and so on, until the first PCE local to the PCC computes the complete path, and returns the results to the PCC. Thus, PCEs, in particular, may be advantageously used because of their ability to have a more complete TE topology based on communication with other PCEs. Illustratively, the chain of distributed PCEs required to compute a path from the source to the destination may be referred to herein as a "PCE chain" or a "path computation chain", as will be appreciated by those skilled in the art.

Notably, PCE process/services 246 contain computer executable instructions executed by each processor 220 to perform functions related to PCEs as will be understood by those skilled in the art and as described herein. Further, PCC process/services 244 (e.g., a particular embodiment of interested node process/services 244) may contain computer executable instructions executed by each processor 220 to perform functions related to PCCs as will also be understood by those skilled in the art and as described herein.

As noted, there are currently no known end-to-end OAM tools available to obtain performance metrics and/or other information from PCEs along particular PCE (path computation) chains. For example, PCCs or other interested nodes (e.g., a network management node/system, NMS) may wish to determine the cause of a failure/delay, such as which particular PCE is the cause/bottleneck, what is the cause, etc. OAM tools configured to obtain such information could be used to more efficiently select a PCE (or set of PCEs), such as an alternate PCE, or for general network management, such as where performance metrics of the PCE chains are particularly difficult/challenging to monitor (e.g., inter-domain chains).

OAM for PCE Chains

According to embodiments of the disclosure, an interested node (e.g., a PCC, NMS, etc.) may send a PCE monitor request along a path computation chain to request performance information about one or more PCEs along the chain. In response, the interested node may receive a PCE monitor reply having performance information about the one or more PCEs along the chain. Also, according to embodiments of the disclosure, one or more PCEs (along the chain) may receive the PCE monitor request and forward the request downstream along the chain. Upon the request reaching a final PCE, the PCE monitor reply is generated and each PCE along the chain may insert the requested performance information into the reply, which is then forwarded with the performance information along the path computation chain toward the interested node.

In an illustrative embodiment, OAM process/services 245 contain computer executable instructions executed by each processor 220 to perform functions relating to the novel techniques described herein to provide OAM for PCE chains in a computer network. For example, an interested node (e.g., a PCC and/or NMS, etc.) may utilize its OAM process to perform interested node OAM functions, while a PCE may utilize its OAM process to perform PCE OAM functions, each as described herein. Accordingly, OAM process/services 245 may cooperate with interested node process/services 244 and/or PCE process services 246 as described herein. Notably, OAM process/services 245 may also operate in accordance with the OAM techniques described in the Internet Draft entitled *A Set of Monitoring Tools for Path Computation Element Based Architecture* <draft-vasseur-pce-monitoring-01.txt>, by Jean-Philippe Vasseur, dated Oct. 18, 2006, the contents of which are hereby incorporated by reference in its entirety.

Operationally, an interested node (e.g., node A) may be configured to send a PCE monitor request in response to a number of stimuli. For instance, the interested node may be embodied as a PCC as described above, and may thus desire a computed path to one or more destinations, e.g., node B (in AS3). As such, the interested node (PCC) may be configured to dynamically trigger the request in response to the desire for path computation (e.g., preemptively), such as to determine an efficient PCE selection based on metrics described herein, to gather performance metrics during an actual path computation request process, etc. Also, a PCC may be configured to send the request in response to a path computation failure, such as to determine a possible cause of the failure. For example, a PCC (e.g., node A) may send a path computation request to a local PCE (e.g., PCE1), and may later receive notification of a path computation failure/error. It may be desirable to determine a cause of the failure/error in order to possibly select an alternate PCE (along the PCE chain), to repeat the request at a later time, or other option based on the response received, as described herein. Also, the interested node may be embodied as an NMS, and may thus either dynamically trigger the OAM monitor request (or may receive a manual trigger from a network administrator) for network management, such as troubleshooting and performance monitoring as desired. The request may be issued to a first local PCE (e.g., PCE1), which, in accordance with distributed PCE path computation, may relay/forward the request along an appropriate PCE (path computation) chain accordingly.

Figure 5:
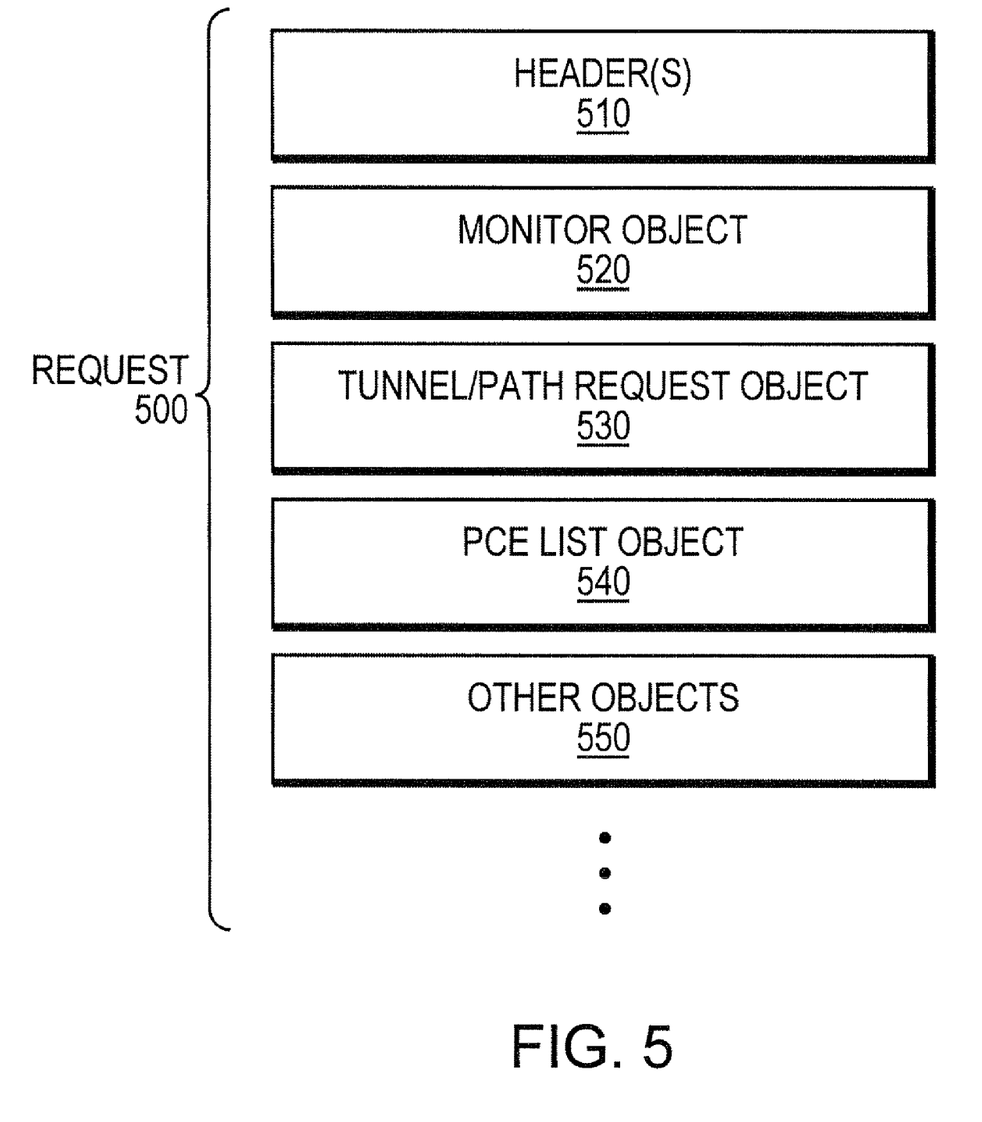
FIG. 5 illustrates an example PCE monitor request message in accordance with one or more embodiments described herein.

Illustratively, the PCE monitor request (or path computation monitor request) may be embodied as a particular PCEP message 300. For instance, FIG. 5 illustrates an example PCE monitor request message ("request") 500 that may be initiated by an interested node in accordance with one or more embodiments described herein to request various performance information/metrics from the PCEs of a PCE (path computation) chain. The request 500 may comprise one or more fields/objects, such as a common header(s) field 510 and one or more OAM-specific fields, such as monitor object 520, tunnel/path request object 530, PCE list object 540, and other fields/objects 550 (e.g., each embodied as TLVs 400).

Monitor object 520 generally comprises the specific requests for information, and may include a check bit/flag, a record bit/flag, and one or more processing time bits/flags (not shown). For example, the check bit may be used to indicate that the interested node requests a path computation chain check, such as to determine whether all required PCEs involved along the path computation chain to a destination are working, operational, functional, etc. (In its simplest form, the request 500 may simply request this information). Also, the record bit may be used to request an identification of the one or more PCEs involved in the chain. Further, processing time bits may be used to request processing metrics, such as one or more flags representing a request for processing time, queue length, timestamps for receiving the request, timestamps for transmitting the request, average processing time, average queue length, etc.

Tunnel/path request object 530 (optional) may be used to relay certain characteristics/attributes of a tunnel/path for which the OAM request is being made, such as one or more destinations (e.g., node B and/or node C) (alternatively, denoted a "destination" object). For example, in order to possibly obtain greater or more specific performance information, the interested node may include within the request 500 particular tunnel/path constraints, affinities, priority, etc. (e.g., may include a specific path computation request). Note that in the event the request 500 is embodied as an actual path computation request, this information may be contained within conventional protocol fields for path computation requests as in a PCEP request message 300 above, e.g., where the monitor object 520 is embodied as an extended field 330, etc.

Also, in accordance with one or more embodiments described herein, the interested node may be configured to compute/determine the PCE chain, and may include a corresponding list specifying such PCEs in the request, e.g., in PCE list object 540. For instance, an NMS (and/or network administrator) may previously be aware of a desired PCE chain to monitor, such as PCE1-PCE2-PCE3-PCE4, to reach destinations (e.g., node B) within AS3. Alternatively, a PCC may be able to compute the PCE chain in various manners, such as a PCE chain through multiple areas/levels, where the identity of the PCEs may be known to the PCC (as will be understood by those skilled in the art).

Notably, the request 500 may be sent to multiple destinations for various reasons, such as for path requests for point-to-multipoint (P2MP) tunnels or other network management purposes. In other words, if multiple destinations of the request 500 are in different domains, multiple PCE chains (e.g., a diverging PCE chain) may result. Accordingly, the tunnel/path request object 530 (destination object) may contain destinations indicating one or more subnets, one or more domains (e.g., AS3 and AS4), one or more particular destination addresses (e.g., node B and node C), one or more access control lists (ACLs), each having one or more destination addresses (e.g., node B and C in one ACL), other nodes not shown in another ACL), etc. (In the event that multiple destinations exist, the diverging PCE chain may result in multiple replies to the interested node, as described below).

Other objects 550 may be defined in accordance with the embodiments described herein and used within the request 500 to convey other information/metrics, such as further requests or other information useful for the request. For example, other PCEP information, such as a request ID, etc., may be included within the request 500. Note that while the objects of the request message are shown in a particular fashion, other implementations may also be possible in accordance with the embodiments described herein. For instance, various objects (e.g., path request object 530) may be contained within other objects (e.g., monitor object 520), etc.

In accordance with one or more embodiments described herein, upon receiving the request 500 originated by the interested node (e.g., node A), a PCE along the PCE (path computation) chain may verify that it is able to comply (e.g., able to compute a path) and/or determine any policy violations. In the event of an inability to comply and/or determined policy violation, the PCE may return an error message (e.g., in the form of a reply message, described below) to the interested node, for example, indicating a cause of the failure (e.g., and clearing the check bit). Otherwise, the receiving PCE (e.g., first PCE1) may determine whether it is a final PCE of the chain, such as in response to a specified chain in the request (e.g., PCE list 540 mentioned above) or a dynamic computation of the chain at the receiving PCE. If another PCE is involved (e.g., in a distributed PCE architecture), the receiving PCE may relay/forward the request to a next-hop (downstream) PCE in the chain. For instance, as described above and as will be appreciated by those skilled in the art, each PCE in a distributed PCE architecture may be configured to dynamically compute the chain, where each PCE either computes/determines the chain path to a downstream PCE or determines that it is the last (final) PCE of the chain.

Figure 6:
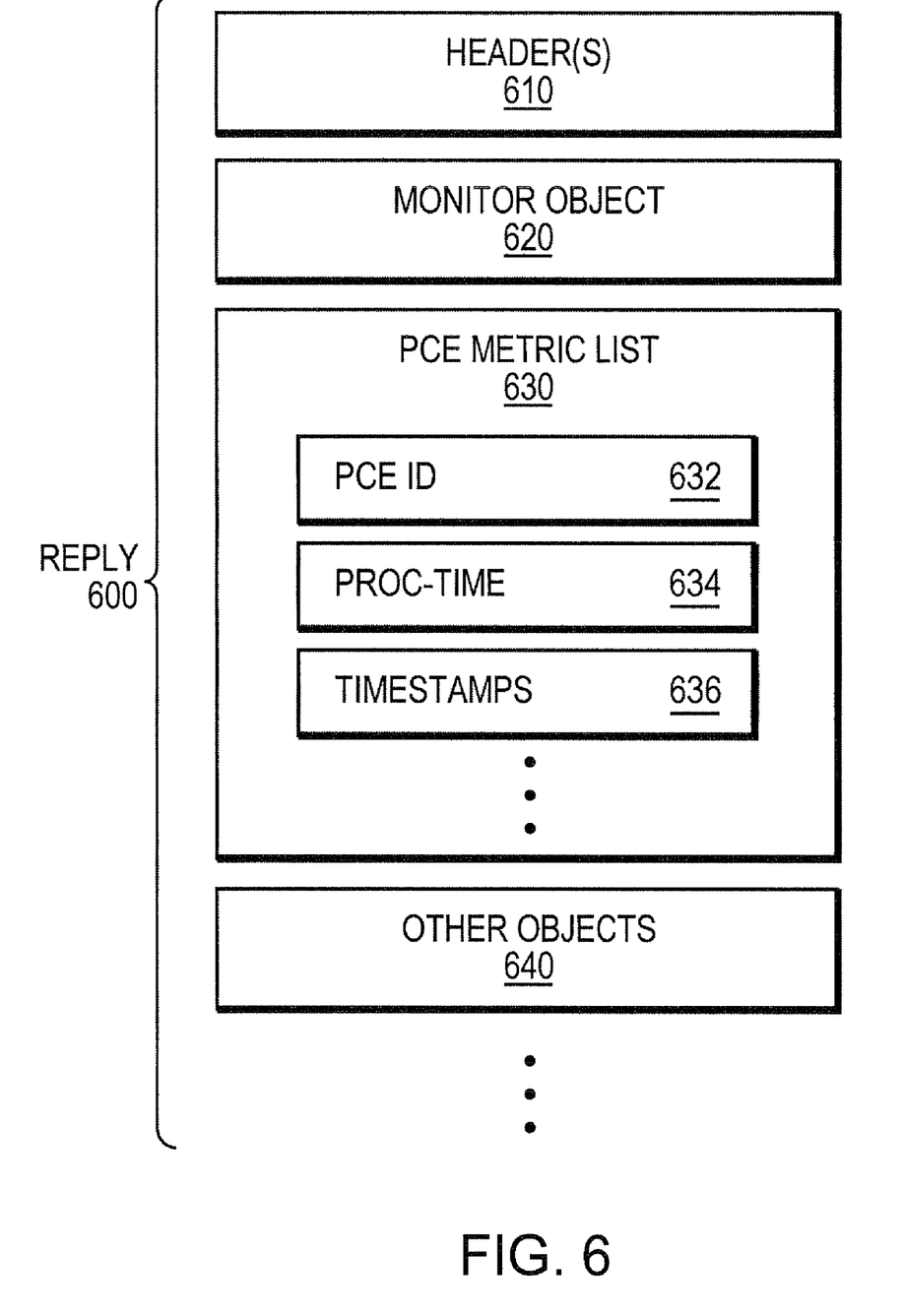
FIG. 6 illustrates an example PCE monitor reply message in accordance with one or more embodiments described herein.

If the PCE receiving the request 500 is the final PCE, all PCEs along the chain are presumably operational/functional (e.g., able to comply and no policy violations), and the final PCE may generate a PCE monitor reply to return/forward toward the interested node. Specifically, the final PCE may generate a PCE monitor reply and may insert performance information as requested by the request 500. For instance, FIG. 6 illustrates an example PCE monitor reply message ("reply") 600 that may be returned to an interested node in accordance with one or more embodiments described herein.

The reply 600 may comprise one or more fields/objects, such as a common header(s) field 610 and one or more OAM-specific fields, such as monitor object 620, PCE metric list 630, and other fields/objects 640 (e.g., each embodied as TLVs 400). Note also that in the event the request 500 is embodied as an actual path computation request, these fields may be contained within extended fields 330 for a conventional path computation reply as in a PCEP reply message 300 above.

Monitor object 620 may comprise substantially the same information as contained within the monitor object 520 of the request 500. For example, the particular information requested may be specified by one or more bits/flags (or, notably, codes), such as a check bit, a record bit, one or more processing time bits, etc. PCE metric list 630 may comprise one or more sub-objects (sub-TLVs) that are configured to contain the particular information/metrics as requested. For example, illustrative information/metric fields may comprise a PCE Identification (ID) field 632, a Processing-time ("Proc-Time") field 634, a timestamp field 636, etc. In particular, each field of the PCE metric list 630 may be used to gather a particular metric as requested, as described herein. For instance, in addition to those shown, separate sub-objects may be configured to gather other processing metrics, such as queue length, available memory, PCE attributes, etc.

Other objects 640 may be defined in accordance with the embodiments described herein and used to convey other information/metrics, such as further information useful for the reply (e.g., other requested and/or not requested information). For example, other PCEP information, such as a request ID, etc., may be included within the reply 600. Note that while the objects of the reply message are shown in a particular fashion, other implementations may also be possible in accordance with the embodiments described herein. For instance, in a similar manner as the request 500 above, various objects of the reply 600 (e.g., PCE-metric list 630) may be contained within other objects (e.g., monitor object 620), etc. Further, in accordance with one or more embodiments described herein, other information of the request 500 that may be necessary/beneficial to have upon receipt of the reply message in addition to those mentioned above, such as tunnel/path request object (from request 500 above) may be included within the reply message 600 (e.g., in monitor object 620 and/or other objects 640). Therefore, the view of reply 600 and request 500 are illustrative, and are meant to be examples used for simplicity and ease of discussion herein.

In accordance with one or more embodiments described herein, the final PCE (e.g., PCE4) may respond to the request 500 by correspondingly inserting the particular requested information into the reply 600. That is, by referencing the monitor object 520 of the request (and other objects, as described herein), the final PCE may determine what information is desired by the interested node (e.g., node A). For example, if the request requests identification of the PCEs of the chain (e.g., a record bit is set), the final PCE may insert its PCE ID into the PCE ID field 632 of the reply 600.

Also, as mentioned, the request may be directed to particular performance metrics, such as, e.g., processing time for particular path computation request (e.g., included in tunnel/path request field 530) or a particular path computation request class (e.g., all requests of a particular priority, etc.), or various processing times related to metrics in general (that is, not to a particular request). (Notably, the requests may be more specifically directed to minimums, maximums, averages, variances, etc.) Accordingly, if a particular path computation request is included within the request 500, the final PCE may determine whether to perform an actual path computation (e.g., based on the tunnel/path characteristics provided in the request 500), an estimation, or neither (e.g., if too busy or otherwise configured). For instance, an actual path computation may provide more accurate metrics, while an estimation may alleviate the additional processing at the final PCE to compute a path. In addition, the final PCE may also be configured to perform actual computation at various times (less congested) and estimations at other times (more congested), etc. Notably, as mentioned, the request 500 may indicate a particular priority of the path computation. As such, the final PCE may perform (or estimate) the path computation at that priority, or may decide (e.g., through local policy) to lower (or otherwise ignore) the priority in order to first serve actual requests currently at the final PCE.

The performance metrics obtained by computing the path or estimating the computation may be inserted into the reply 600, such as within Proc-Time object 634. In the event an estimation is performed, the final PCE may indicate that the value inserted into the reply 600 is an estimation (e.g., by setting an estimation flag/bit). Also, in the event a different priority than what was provided was used, that may also be indicated within the reply. Moreover, a similar indication may be used to specify a reason for not including a metric, such as a congested state, a policy-based decision, etc.

If, on the other hand, the request 500 desires general information/metrics, no path computation (or estimated path computation) need take place. Instead, the final PCE may monitor or determine processing times, queue lengths, etc., for other path computations currently at the final PCE, and may insert that information into the reply 600 accordingly. For example, if a specific priority is included for path computation, but no actual path computation request is mentioned, the final PCE may look to path requests (or hypothetical path requests) at that priority (e.g., queues for that priority) to determine what performance metrics would be applicable to an actual path computation request at that priority. This and other general information not specifically related to a particular path computation request (e.g., general processing availability, etc.) may be obtained and inserted into the reply 600, e.g., into appropriate sub-objects/fields of the PCE metric field 630 (or other fields 640).

For example, in addition to calculated/estimated processing times, the request may specify (or the final PCE may decide independently) that various timestamps are to be included within the reply 600 (e.g., in timestamps field 636). For instance, timestamps may be inserted into the reply corresponding to receipt of the request 500 (or reply 600) and transmission of the reply, thus allowing for collection of waiting and service times at the PCE, e.g., without a need for performing other processing as mentioned above. Other timestamps may be included, such as timestamps at various stages of the PCE's path computation (entering a queue, leaving a queue, receiving the request 500 versus receiving the reply 600, etc.). Notably, based on the request 500 or based on local policy/configuration at the PCE, timestamps may be used in addition to or as an alternative to actual/estimated processing times as in Proc-Time field 634. In particular, various PCEs may not be configured to perform the hypothetical path computation as mentioned above, but may instead provide timestamps that may be useful for OAM for PCE chains accordingly.

Upon generating and populating the reply 600, the final PCE (PCE4) may forward the reply 600 with the performance information along the path computation chain toward the interested node (e.g., node A), i.e., in reverse of the request 500. Notably, the monitor field 620 of the reply may still contain the particular requests for information. Each PCE along the chain that receives the reply 600 (e.g., each "upstream PCE" receives the reply from a downstream PCE) may determine which information is requested, and in a similar manner to the final PCE, may insert the requested performance information into the reply 600. Note that each PCE may determine which information to include independently of other PCEs, such that if one PCE inserts actual performance information, another may insert estimations, while still another may insert only timestamps, etc.

Notably, to insert the performance information at each PCE, a new PCE metric list field 630 may be provided that corresponds to the particular PCE (e.g., with new sub-objects 632-636, etc.). Alternatively, new sub-objects (632-636) may be inserted for the particular PCE within the current PCE metric list field 630. For instance, separate additional sub-objects may be included within the field 630, or the field 630 may be divided into sub-objects (not shown) corresponding to each PCE, where each sub-object corresponding to each PCE contains its own sub-objects 632-636, accordingly.

Once the performance metrics are inserted into the reply 600, each PCE may forward the reply along the chain toward the interested node (e.g., to a next upstream PCE or to the interested node itself). For example, the final PCE, PCE4, may return the reply 600 to PCE3, which may insert its information and forward the reply to PCE2 (or directly to PCE1). PCE2 may then insert its information and forward the reply to PCE1, which may insert its information and return the reply 600 having the performance information of each PCE along the chain to the interested node.

In addition to point-to-point (P2P) PCE (path computation) chains (e.g., from node A to PCE4), diverging chains may result from requests sent to multiple destinations, particularly in different domains. For example, as shown in FIG. 1, node A may also be interested to know path computation metrics for a diverging point-to-multipoint (P2MP) path to node B (in AS3) and node C (in AS4). Accordingly, the request 500 may be forwarded along the diverging path as would a conventional path computation request be sent along a diverging PCE chain, as understood by those skilled in the art. As such, each divergent portion of the chain may have its own corresponding final PCE (e.g., an additional chain from PCE2 to PCE5 and PCE6), and the procedures/techniques described above may be duplicated along the additional divergent chain(s). In this manner, multiple corresponding replies 600 may be propagated/returned to the interested node, which may interpret the multiple responses accordingly. Note that a PCE receiving multiple reply messages, e.g., a merging PCE (PCE2), may combine the multiple replies into a single reply message 600 to be forwarded to the interested node (e.g., as the merging PCE may also do for conventional distributed PCE architecture path computation for P2MP paths).

Notably, in the event that a PCE along the chain receives the request 500, but not a reply 600 or other error message (e.g., after expiration of a configurable timer), that PCE may determine that an existing downstream PCE (e.g., the next-hop downstream PCE) is non-responsive, and may either attempt to send an additional request to an alternate downstream PCE (if available), or may return a reply 600 to the interested node indicating a failure of the path computation chain (e.g., the PCE acts as a final PCE, where the generated reply is specifically to indicate a failure).

Figure 7:
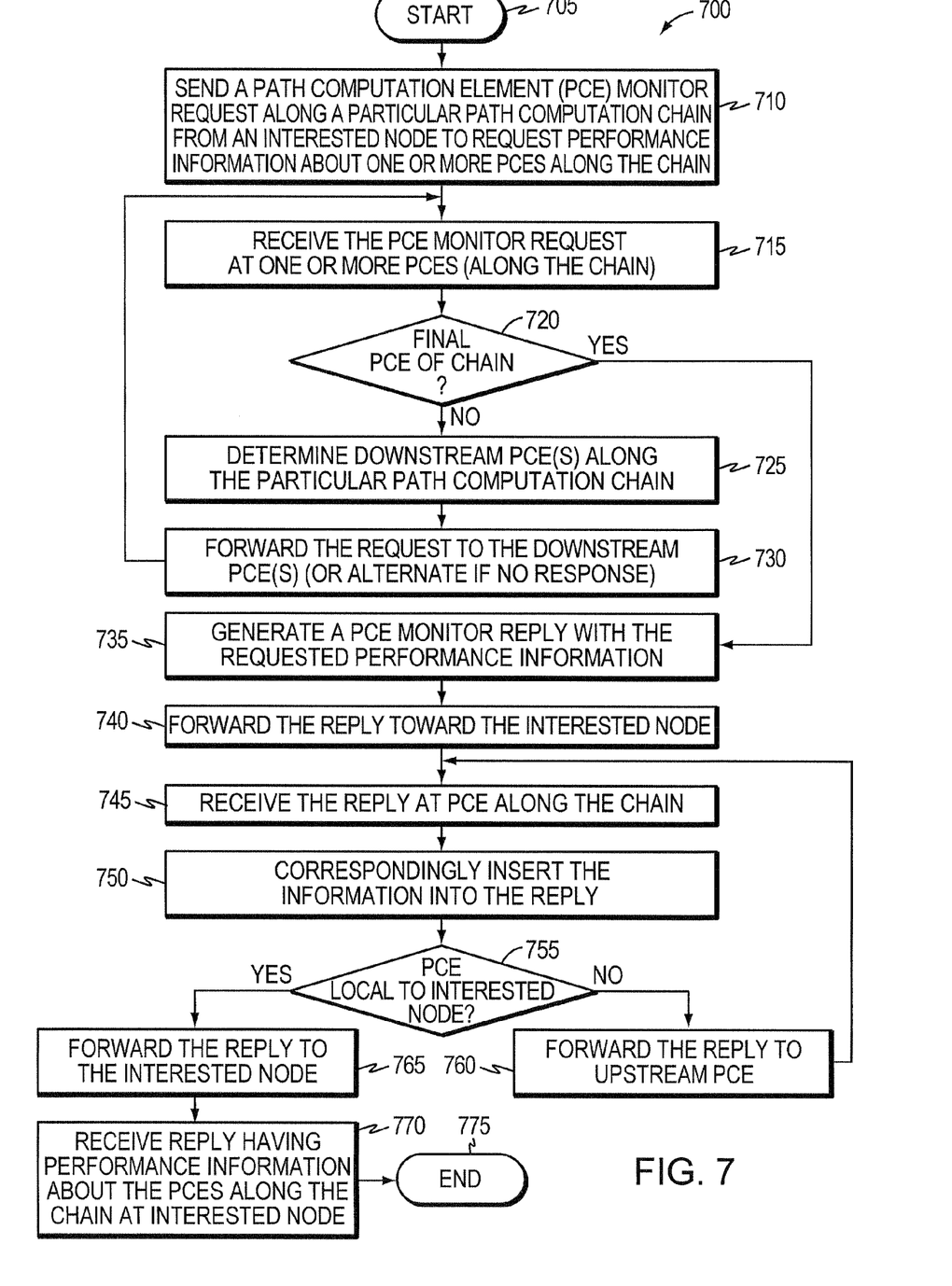
FIG. 7 illustrates an example procedure for providing OAM for PCE chains in accordance with one or more embodiments described herein.

FIG. 7 illustrates an example procedure for providing OAM for PCE chains in accordance with one or more embodiments described herein. The procedure 700 starts at step 705, and continues to step 710, where the OAM process 245 of an interested node (e.g., PCC/node A) sends a PCE monitor request 500 along a particular path computation chain to request performance information about one or more PCEs along the chain. For example, as mentioned above, the interested node may wish to send the request 500 to destinations corresponding to node B (AS3) and node C (AS4). In step 715, a PCE along the chain (e.g., PCE1) receives the PCE monitor request 500, and in step 720 determines whether it is the final PCE along the chain. If the receiving PCE is not the final PCE of the chain in step 730, the receiving PCE may determine one or more downstream PCEs along the particular path computation chain in step 725, such as by computing the chain or by an included PCE list 540 in the request 500. For example, PCE1 may determine that PCE2 is a next-hop/downstream PCE of the chain, while PCE2 may, in turn, determine that both PCE3 and PCE5 are corresponding downstream PCEs (a diverging chain), etc. The (non-final) receiving PCE may then forward the request 500 in step 730 to the next-hop downstream PCE(s) (as determined in step 725). The procedure 700 at the next-hop downstream PCE continues at step 715 (receiving the request 500 at the downstream PCE).

If, on the other hand, the receiving PCE is the final PCE of the chain at step 720 (e.g., PCE4 and/or PCE6), the final PCE may generate a PCE monitor reply 600 with the requested performance information in step 735, and may forward the reply toward the interested node (i.e., upstream along the chain toward PCC/node A) in step 740. In step 745, each PCE along the chain may in turn receive the reply 600, and correspondingly insert the requested performance information into the reply in step 750. For instance, as described in detail above, the OAM process 245 of each of the PCEs along the chain may compute and/or estimate the information (e.g., processing times, queue lengths, etc.), or may otherwise determine the information (e.g., PCE IDs, etc.).

If the PCE inserting the information in step 750 is not the PCE local to the interested node (e.g., PCE1 local to node A) in step 755, the PCE forwards the reply 600 toward the interested node along the chain in step 760, and the procedure returns to step 745 where a next upstream PCE receives the reply. However, if the PCE inserting the information is the PCE local to the interested node in step 755, the PCE forwards the reply to the interested node in step 765. The interested node may receive the PCE monitor reply 600 having performance information about the one or more PCEs along the chain (e.g., as requested or as differently supplied by the PCEs along the chain) in step 770, and the procedure 700 ends at step 775.

Notably, in the event a non-final PCE does not receive a reply 600 from a downstream PCE, the PCE may determine an alternate downstream PCE (if one exists) in step 725, and may forward the request to the alternate PCE in step 730. If a particular PCE of the chain does not receive any response (reply 600) from a downstream PCE (e.g., as it would in step 745), the PCE may act as the final PCE of the chain, and may forward a generated reply 600 toward the interested node as in step 735 with an indication of PCE failure, as mentioned above.

Advantageously, the novel techniques described herein provide OAM for PCE chains in a computer network. By providing a set of tools (requests 500 and replies 600 as processed by OAM process 245 of interested nodes and corresponding PCEs), the novel techniques may be used to gather performance metrics of a path computation chain, such as for troubleshooting to find causes of failures, or for general network management, etc. Specifically, the techniques described above may be used for intra-domain or inter-domain OAM, particularly in instances where OAM is challenging and/or critical. Also, the performance metrics/information may be processed/gathered on a per-hop basis, thus discovering potential bottlenecks and specific failures at individual PCEs along the path computation chain accordingly. Further, the dynamic aspects of one or more embodiments described herein alleviate the need for cumbersome and inefficient manual configuration.

While there have been shown and described illustrative embodiments that provide OAM for PCE chains in a computer network, it is to be understood that various other adaptations and modifications may be made within the spirit and scope of the present invention. For example, the embodiments have been shown and described herein with reference to particular protocol messages, such as PCEP messages 300 embodied as PCE monitor requests 500 and replies 600. However, the embodiments of the invention in their broader sense are not so limited, and may, in fact, be used with other OAM-capable communication protocols between interested nodes and PCEs operable in accordance with one or more embodiments described herein. Further, while the above description describes particular OAM performance metrics, additional metrics not explicitly mentioned herein may be equally applied to the embodiments described herein, and such additional metrics are within the scope of the present description accordingly.

Moreover, while the embodiments described above are directed to inserting the performance metrics at each PCE into the reply message 600 on its return travel from the final PCE of the chain to the interested node, one or more alternative embodiments may insert the requested information into the request 500 and forward the request towards the final PCE with the information (i.e., the reply 600 is untouched during propagation to the interested node). Also, various other alternative embodiments may be utilized, such as where each receiving PCE returns a reply 600 conveying its own information to the interested node, and forwards the request 500 to a next-hop downstream PCE to do the same, etc.

The foregoing description has been directed to specific embodiments of this invention. It will be apparent, however, that other variations and modifications may be made to the described embodiments, with the attainment of some or all of their advantages. For instance, it is expressly contemplated that the components and/or elements described herein can be implemented as software, including a computer-readable medium having program instructions executing on a computer, hardware, firmware, or a combination thereof. Also, electromagnetic signals may be generated to carry computer executable instructions that implement aspects of the present invention over, e.g., a wireless data link or a data network, such as the Internet. Accordingly this description is to be taken only by way of example and not to otherwise limit the scope of the invention. Therefore, it is the object of the appended claims to cover all such variations and modifications as come within the true spirit and scope of the invention.

What is claimed is:

1. A method, comprising:
    determining a particular path computation chain for computing an inter-domain path from a source in one domain to a destination in another domain, the particular path computation chain including a plurality path computation elements (PCEs) associated with different domains along the inter-domain path, wherein each PCE is capable of, in response to receipt of a path computation request, computing at least a portion of the inter-domain path within the PCE's associated domain based on a network graph and applied computational constraints, and returning a response that includes the computed at least a portion of the inter-domain path;
    sending, from an interested node, a path computation element (PCE) monitor request along the particular path computation chain to request processing metrics for path computations performed at one or more PCEs along the path computation chain; and
    receiving, at the interested node, a PCE monitor reply including processing metrics for path computations performed at the one or more PCEs along the path computation chain.

2. The method as in claim 1, wherein the request further requests information regarding PCE functionality of the one or more PCEs along the path computation chain.

3. The method as in claim 1, wherein the processing metrics include one or more processing metrics selected from the group consisting of: processing time for path computations, queue length for path computations, average processing time for path computations, and average queue length for path computations.

4. The method as in claim 1, wherein the request further requests an identification of the one or more PCEs along the path computation chain.

5. The method as in claim 1, further comprising:
    sending the request along a diverging path computation chain.

6. The method as in claim 5, further comprising:
    receiving a plurality of replies, each corresponding to a diverging path computation chain.

7. The method as in claim 1, wherein the request is for processing metrics regarding a particular message priority.

8. The method as in claim 1, wherein the request is for processing metrics regarding a path computation to the destination.

9. The method as in claim 8, wherein the request is for processing metrics regarding a tunnel to the destination, the tunnel having one or more characteristics.

10. The method as in claim 8, wherein the particular destination is selected from the group consisting of: one or more destination addresses; and one or more access control lists (ACLs), each having one or more destination addresses.

11. The method as in claim 1, further comprising:
    specifying the path computation chain in the request.

12. The method as in claim 1, wherein the path computation chain is dynamically computed by each of the one or more PCEs, where each PCE either computes the chain path to a downstream PCE of the plurality of PCEs or determines that it is the last PCE of the path computation chain.

13. The method as in claim 1, wherein the request is performed in response to a stimulus selected from the group consisting of: a manual trigger; a dynamic trigger for network management; a dynamic trigger for an actual path computation; and a dynamic trigger in response to a path computation failure for an actual path computation.

14. A method, comprising:
    receiving a PCE monitor request from an interested node, at a path computation element (PCE) of a path computation chain, the path computation chain including a plurality of PCEs that collectively are capable of computing an inter-domain path from a source in one domain to a destination in another domain, the PCE individually capable of computing at least a portion of the inter-domain path within a domain associated with the PCE based on a network graph and applied computational constraints, the PCE monitor request requesting processing metrics for path computations performed at the PCE;
    determining whether the PCE is a final PCE of the path computation chain;

if so, i) inserting the requested processing metrics into a PCE monitor reply, and ii) forwarding the reply with the processing metrics along the path computation chain toward the interested node; and if not, i) forwarding the request to one or more next-hop downstream PCEs, ii) receiving the reply from each next-hop downstream PCE, iii) inserting the requested processing metrics into the reply, and iv) forwarding the reply with the processing metrics along the path computation chain toward the interested node.

15. The method as in claim 14, further comprising:
determining the one or more downstream PCEs in response to either a specified path computation chain in the request, or a dynamic computation at the PCE.

16. The method as in claim 14, wherein the request is for processing metrics regarding a particular message priority, the method further comprising:
inserting the requested processing metrics pertaining to the particular message priority into the reply.

17. The method as in claim 14, wherein the request further requests identification (ID) of the plurality of PCEs in the path computation chain, the method further comprising:
inserting an ID of the PCE into the reply.

18. The method as in claim 14, further comprising:
determining that an existing downstream PCE is non-responsive; and either
i) attempting to send the request to an alternate downstream PCE, or
ii) returning a PCE monitor reply to the interested node indicating a failure of the path computation chain.

19. The method as in claim 14, wherein the processing metrics include one or more processing metrics selected from the group consisting of: processing time for path computations, queue length for path computations, average processing time for path computations, and average queue length for path computations.

20. A system, comprising:
an interested node configured to i) send a path computation element (PCE) monitor request along a particular path computation chain for computing an inter-domain path from a source in one domain to a destination in another domain, the particular path computation chain including a plurality of PCEs associated with different domains along the inter-domain path, wherein each PCE is capable of, in response to receipt of a path computation request, computing at least a portion of the inter-domain path within a domain associated with the PCE based on a network graph and applied computational constraints, and returning a response that includes the computed at least a portion of the inter-domain path, the PCE monitor request to request performance information about one or more of PCEs along the path computation chain; and ii) receive a PCE monitor reply having processing metrics for path computations performed at the one or more PCEs along the chain; and
is one or more PCEs, each configured to receive the PCE monitor request and determine whether the PCE is a final PCE of the path computation chain, wherein the final PCE is configured to i) insert the requested processing metrics into the PCE monitor reply, and ii) forward the reply with the processing metrics along the path computation chain toward the interested node, and wherein each PCE not the final PCE is configured to i) forward the request to one or more next-hop downstream PCEs, ii) receive the reply from each next-hop downstream PCE, iii) insert the requested processing metrics into the reply, and iv) forward the reply with the processing metrics along the path computation chain toward the interested node.

21. An interested node, comprising:
one or more network interfaces;
a memory configured to store program instructions; and
a processor configured to execute the program instructions stored in the memory, the program instruction, when executed, to
send, via a network interface of the one or more network interfaces, a path computation element (PCE) monitor request along a particular path computation chain for an inter-domain path, to request processing metrics for path computations performed at one or more PCEs located along the particular path computation chain, wherein each PCE is capable of, in response to receipt of a path computation request, computing at least a portion of the inter-domain path within a domain associated with the PCE based on a network graph and applied computational constraints, and returning a response that includes the computed at least a portion of the inter-domain path; and
obtain a PCE monitor reply, the PCE monitor reply including processing metrics for path computations performed at the one or more PCEs located along the particular path computation chain.

22. The interested node as in claim 21, wherein the request further requests an identification of the one or more PCEs in the particular path computation chain.

23. The interested node as in claim 21, wherein the program instruction, when executed, are further to send, via the network interface of the one or more network interfaces, the PCE monitor request also along a diverging path computation chain, different from the particular path computation chain.

24. The interested node as in claim 23, wherein the program instruction, when executed, are further to obtain a plurality of replies, each corresponding to a different path computation chain.

25. The interested node as in claim 21, wherein the PCE monitor request is for processing metrics regarding a path computation to a particular destination.

26. The interested node as in claim 21, wherein the PCE monitor request includes a listing of the one or more PCEs in the particular path computation chain.

27. A path computation element (PCE), comprising:
one or more network interfaces;
a memory configured to store program instructions; and
a processor configured to execute the program instructions stored in the memory, the program instruction, when executed, to
process a PCE monitor request received on one or the one or more network interfaces from an interested node, the PCE monitor request requesting processing metrics for path computations performed at each of one or more PCEs along a particular path computation chain for an inter-domain path, wherein each PCE is capable of, in response to receipt of a path computation request, computing at least a portion of the inter-domain path within a domain associated with the PCE based on a network graph and applied computational constraints, and returning a response that includes the computed at least a portion of the inter-domain path;
determine whether the PCE is a final PCE of the one or more PCEs along the path computation chain;
if the PCE is the final PCE of the one or more PCEs along the path computation chain, insert the requested processing metrics into a PCE monitor reply, and send the PCE monitor reply with the processing metrics along the path computation chain; and if the PCE is not the final PCE of the one or more PCEs along the path computation chain, send the PCE monitor request to one or more next-hop downstream PCEs, obtain a reply that includes requested processing metrics from each next-hop downstream PCE, and send the reply with the processing metrics along the path computation chain.

28. The PCE as in claim 27, wherein the program instructions, when executed, further determine the one or more downstream PCEs in response to a specified chain in the PCE monitor request.

29. The PCE as in claim 27, wherein the program instructions, when executed, further determine the one or more downstream PCEs in response to a dynamic computation performed by the processor of the PCE.

30. The PCE as in claim 27, wherein the program instructions, when executed, further determine that an existing downstream PCE is non-responsive, and return a PCE monitor reply to the interested node indicating a failure of the path computation chain.

31. The PCE as in claim 27, wherein the processing metrics requested comprises one or more processing metric selected from the group consisting of: processing time for path computations, queue length for path computations, average processing time for path computations, and average queue length for path computations.

* * * * *

UNITED STATES PATENT AND TRADEMARK OFFICE
CERTIFICATE OF CORRECTION

PATENT NO. : 8,254,272 B1
APPLICATION NO. : 11/680388
DATED : August 28, 2012
INVENTOR(S) : Jean-Philippe Vasseur Page 1 of 1

It is certified that error appears in the above-identified patent and that said Letters Patent is hereby corrected as shown below:

In the Claims:

Col. 17, line 57, claim 20 should read: "~~is~~ one or more PCEs, each configured to receive the PCE"

Signed and Sealed this
Fourth Day of June, 2013

Teresa Stanek Rea
*Acting Director of the United States Patent and Trademark Office*